Aug. 21, 1934.  P. W. LEFFLAND  1,970,609
AUTOMOBILE ACCESSORY
Filed Aug. 18, 1931   2 Sheets-Sheet 1
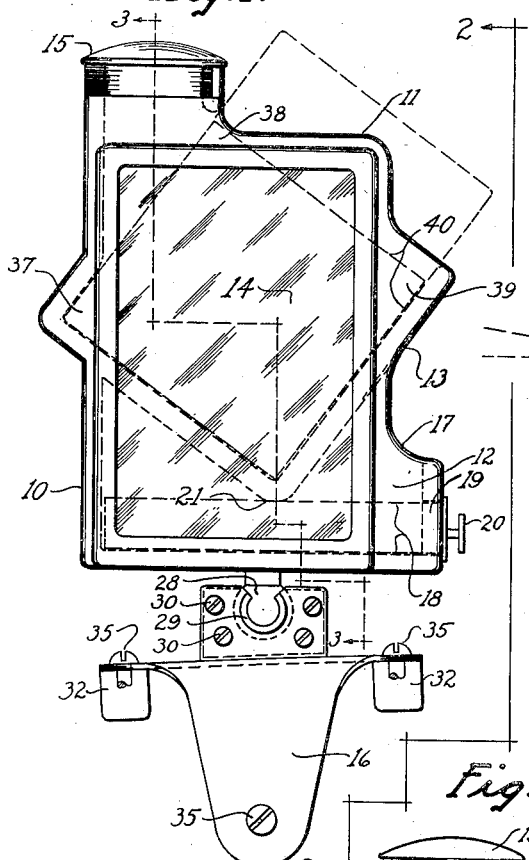
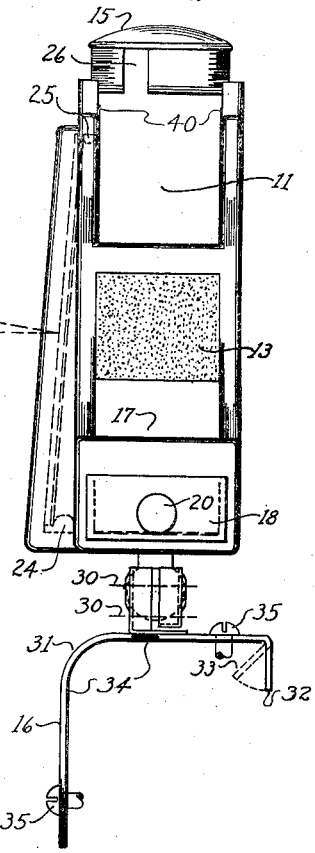
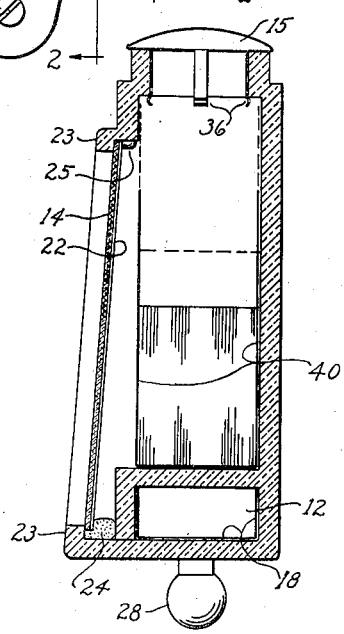
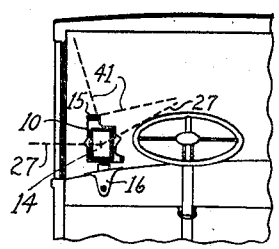
INVENTOR.
Paul W. Leffland Aug. 21, 1934.                P. W. LEFFLAND                1,970,609
                            AUTOMOBILE ACCESSORY
                             Filed Aug. 18, 1931            2 Sheets-Sheet 2

INVENTOR.
Paul W. Leffland

Patented Aug. 21, 1934

1,970,609

UNITED STATES PATENT OFFICE 1,970,609

AUTOMOBILE ACCESSORY

Paul W. Leffland, Dallas, Tex.

Application August 18, 1931, Serial No. 557,811

5 Claims. (Cl. 206—19.5)

The present invention relates to a new and improved combined cigarette package and ash receptacle having adjustable reflective means for providing two distinct desirable reflective views to the driver of the automobile, to which the accessory is attached.

In accordance with the present invention, I have designed an automobile accessory which will provide, in a minimum of space, by unitary construction, five conveniences for the driver. These five features, comprised in this single accessory are: an inclined cigarette package receptacle; an ash receptacle; an inclined striking surface for matches; a reflective means adaptable to be adjusted so that the driver of the automobile may view any other automobile passing or about to pass on the driver's left; a convex reflective means so that the driver of the automobile may view traffic signal lights overhead at street intersections when desirable. I pivotally attach the main body of my accessory to a supporting means which is designed to be mounted upon the well known automobile instrument panel or dash top. By this pivotal relation of the main body of my accessory, carrying the two reflective means, to the automobile instrument panel or dash, there is provided the best possible reflective views, by the said adjustment.

Other objects are to provide these features comprising my invention in the most desirable combined unitary construction to allow an accessory which will require a minimum of space and be economic in construction.

With these and other objects in view, the invention consists in certain novel features of construction and combinations and arrangements of parts, as will be more fully hereinafter set forth and claimed in the claims. The invention may be more fully understood from the following description in connection with the accompanying drawings, in which—

Figure 1 is a front elevation of my accessory taken from the mirror side, showing all of the features of my new accessory and further showing a cigarette package in place indicated by dotted lines.

Figure 2 is a side elevation of my accessory taken on line 2—2 of Figure 1.

Figure 3 is a vertical section of my accessory taken on line 3—3 of Figure 1, showing the ball at the bottom in elevation with the pivotal support yet to be applied to same.

Figure 4 is a portional elevation forward of the interior of an automobile body showing principally the well known side door and window, the steering wheel, the windshield and the instrument panel or dash and showing the approximate location of a type of my accessory mounted upon the instrument panel or dash and showing the approximate reflective views obtainable to the driver by use of my accessory.

Figure 5:
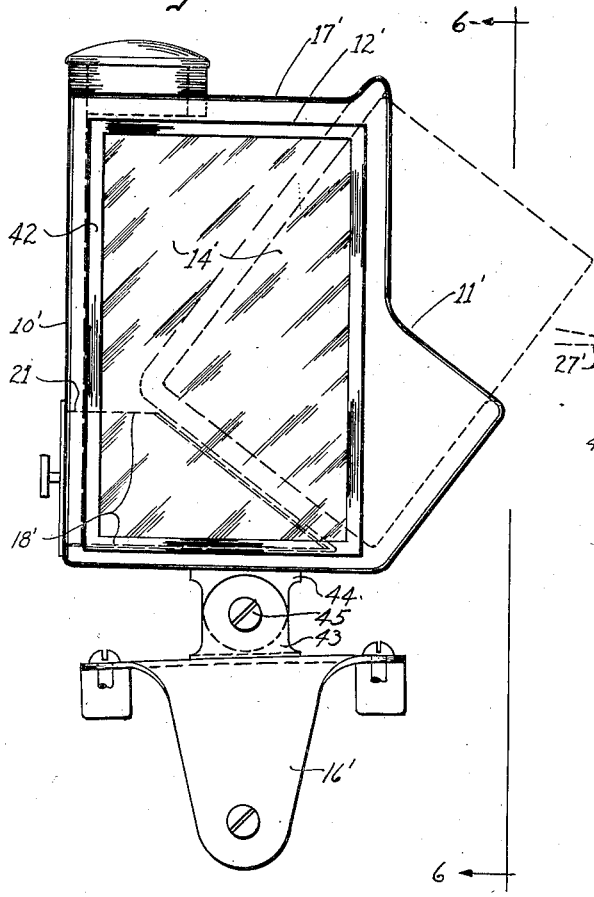

Figure 5 is a front elevation of a modification of my accessory taken from the mirror side and is substantially the same as shown in Figure 1 except that in this modification I show the ash receptacle above the inclined receptacle as another desired arrangement for these receptacles, and further I show the reflective mirror set out from the front wall of the main body of the accessory on a pivotal mounting for the purpose of separate adjustment of the mirror, while the support for the main body may be non-pivotal or adjustable as shown.

Figure 6:
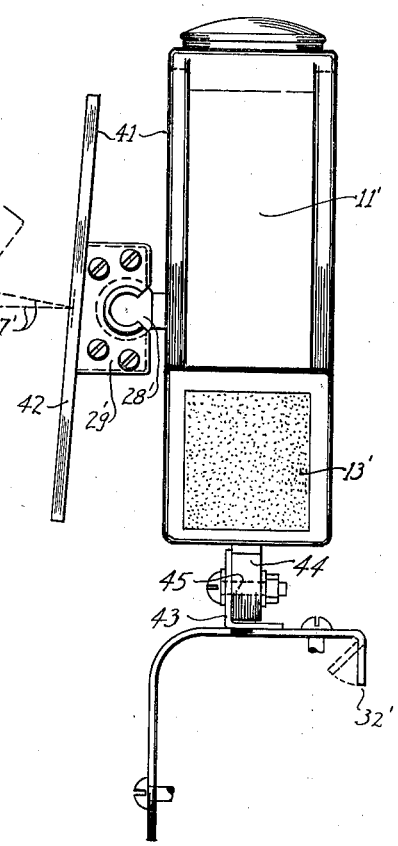

Figure 6 is a side elevation taken on line 6—6 of Figure 5.

Figure 7:
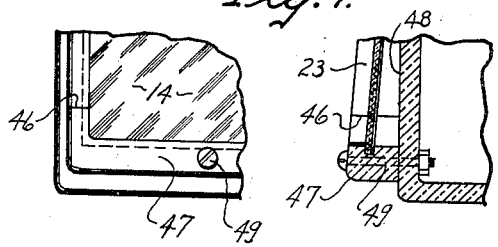

Figure 7 shows a mirror setting which I employ in using a fixed mirror as shown in Figure 1, however using the said mirror in connection with my modified accessory having the ash receptacle above the inclined receptacle as shown in Figures 5 and 6.

In the drawings, and referring more specifically to Figure 1, I have used the reference numeral 10 to designate generally the body of my combined automobile accessory which includes a cigarette package receptacle 11; an ash receptacle 12; a striking surface for matches 13; a mirror 14; a convex mirror or nickeled cap 15, either of which may be used. Further, I have used the reference numeral 16 to designate a pivotal supporting means for the main body portion of my accessory, the said supporting means being adapted to be mounted upon an automobile instrument panel or dash.

As shown in Figure 1, the main body portion of this invention indicated generally by the reference numeral 10, may be made of glass or of any suitable material which will add generally to the ornamentality of the piece, while the corners may be rounded off as shown to give the accessory an artistic configuration. The body portion of the accessory is cast or formed so that it will include an inclined receptacle, as shown, for the purpose of providing a space for a cigarette package or for matches and by virtue of this inclined setting make it convenient that cigarettes may be easily taken from the package in the receptacle, or if matches are placed therein, to make it convenient that they may be taken. Further, the inclined bottom of this receptacle forms a top side for an ash receptacle. This ash receptacle is indicated by numeral 12, and may be of any suitable depth while the bottom and sides, of course, form in part the main body of the accessory. I provide an opening to the ash receptacle as at 17, while immediately above this opening and upon the bottom side of the inclined receptacle wall I provide a match striking surface 13, which is substantially roughened for the purpose specified. The reference numeral 18 indicates a drawer for removal of ashes which is slidably placed in an opening 19 while 20 is any suitable holding means on the drawer. This drawer is designed to preferably fit tightly against the bottom juncture of the inclined partition, as at 21.

As shown in Figures 1, 2, and 3, respectively, the reflective means 14, together with any suitable protective back 22, is set in the framing opening 23 by means of the yieldable holding means 24 at the bottom and the projecting lug 25 at the top. Preferably, I provide a metal shape 40 which may be pressed into position for the purpose of separating the receptacle 11 from the space 38. This metal shape bears against the inside walls of the main body portion as at 37, 38 and 39. The mirror and its backing are slipped down into position thru the opening 26, before the convex reflective means 15 is applied to the main body 10. The mirror, of course, forms a front wall of the main body 10 and is set at an incline as shown and further as indicated by the lines of reflection 27 to its center. The reflective angle formed by these lines may be, of course, variably adjusted by means of the pivotal support of the main body portion of the accessory. This support I have indicated generally by 16 and further is described by 28 being a round true ball preferably cast integral with the body 10, and held pivotally by the socket 29 which is adjustably tightened about 28 by means of thru screws 30 which I provide with lock nuts on one end. The plate of the support is preferably rounded as indicated at 31, but may be shaped to fit any of the various shapes of automobile instrument panel or dash tops, while preferably projections of the plate at its ends are turned down as at 32 and designed to be bent back under the top of the instrument panel or dash, as shown by 33. The numeral 34 indicates a felt or padding which may be preferably glued to the under side of the plate, while 35 indicates metal fastening screws, however the lowermost screw fastening only should be required to mount the attachment to the average automobile instrument panel or dash, while a great number of instrument panels or dashes are provided with a screw at an approximate desired location upon the panel or dash and the lowermost hole in 16 may be designed to match and attach using the present screw.

Referring to 15, which is shown in the drawings as a convex faced pressed metal cap of nickeled metal capable of casting reflective rays, this piece is pressed into place as shown and held by the clips 36. However, 15 may be furnished as a convex faced mirror set in a small frame having clips 36 and set substantially as the pressed metal reflective means. This convex faced cap or mirror is of a good reflective grade and of true shape in order that no difficulty will be experienced in obtaining a reflective view from the upper left of the automobile thru the windshield. Of course, inasmuch as this reflective means is sufficiently convex, no adjustment will be required for same.

In Figures 5 and 6 I have shown a modification of my device embodying the present invention. In this instance I have embodied the inclined cigarette package receptacle 11' and the ash receptacle 12', however placing the ash receptacle above the inclined receptacle, while the ash receiving opening 17' is at the top of the main body, as shown. Further, I have shown in this type of my accessory the reflective mirror set in an individual frame, the said frame being pivotally mounted to the front wall of the accessory body proper and set apart from the wall as at 41. The mirror 14' is held in any type of suitable frame 42, the said frame is carried upon the pivotal means which is made substantially as heretofore described and shown, while for this modified type of my device the ball 28' is situated upon the front wall of 10'. Further, in this modified type of my invention, the ash drawer 18' is substantially as heretofore described however in the approximate shape as shown in Figure 5. I provide the supporting means with the plate 16' as heretofore described but carrying at its top an upwardly projecting clip 43 designed to match a downwardly projecting lug 44 which is cast upon the main body portion of the accessory, while the screw 45 passes thru the clip and the lug and is designed to be tightened by a lock nut at its end. The arrangement is designed in order that the main accessory body may be moved to either side with relation to the supporting plate, the thru screw 45 being the axis.

In Figure 7, which is a part elevation of the lower extremity of a reflective mirror and its setting means and a section thru same, I show a fixed mirror 14' set in the modified type of my accessory in which the ash receptacle is above the inclined receptacle. For this modified type, in the event that I desire to use a fixed mirror instead of an adjustable one, the mirror cannot be set in place from the interior of the accessory body as shown and described for my other type of fixed mirror inasmuch as the ash and inclined receptacles must have an unbroken division wall and further inasmuch as these receptacles must have an unbroken front wall. I therefore set the mirror from the exterior of the accessory body by slipping the mirror up from the bottom into the framing opening 23 while the bottom of the framing opening 23 is cut flush as at 46. A bottom framing strip 47 across the bottom of the mirror retains the mirror as shown by virtue of the strip 47 being drawn up against the front wall 48 by means of the thru screw and nut 49.

Referring to Figure 4, a type of my accessory is shown mounted upon the top of the well known instrument panel or dash of an automobile in the desired location. The numeral 27 designates the approximate line of the reflective view which is obtainable to the driver thru one or more of the well known automobile side windows at the driver's side of the automobile by virtue of the reflective means 14, while the numeral 41 designates another reflective view obtainable to the driver thru the well known windshield opening by virtue of the convex reflective means 15. My accessory is designed to serve the numerous purposes specified, however, it is constructed to occupy a minimum of space and will not obstruct the driver's view of the road ahead or to the left front when attached at its required location upon the instrument panel.

Obviously, I may provide the pivotal supporting means upon the side wall of any of the types hereinbefore described and attach said support to the side frame of the windshield jamb or further, I may provide the pivotal supporting means upon the back wall of any of the types hereinbefore described and attach the accessory to the windshield by providing upon the support one or more rubber vacuum cups.

While the parts and their arrangement and relation have been described more or less specifically it is obvious that various other changes and alterations might be made in the general form and arrangement of the parts described without departing from the invention. Hence I do not limit myself to the details herein set forth, but shall consider myself at liberty to make such changes and alterations as do not depart from the spirit and scope of the appended claims.

I claim:

1. In a combined smoker's kit and reflective viewing means, unitary construction whereby a diagonally disposed receptacle open at an upwardly disposed end for the reception of a cigarette package in conjunction with another receptacle accessible for the reception of ashes define as a whole an upstanding substantially rectangular body shape having an upper corner construction for a convex reflector, an attached convex reflector thereon of diameter not greater than the short side of said body shape and in no way disposed within said receptacles, a rectangular mirror at the front of said body shape and contained within the bounds defined by said shape, the receptacles utilizing substantially the body shape and substantially disposed behind the said mirror, means for changing the angle of reflection of said mirror, attaching means supporting the body shape upon an automobile.

2. In a combined smoker's kit and reflective viewing means, unitary construction whereby a bottom wall, an upstanding substantially rectangular rear wall, a narrower substantially rectangular side wall defined in interior dimension by the thickness of a cigarette package, a portional front wall of substantially the outline of said rear wall and having an outwardly protruding inclined framing opening within its bounds and a mirror set at an incline therein, define an upper corner supporting structure having an attached convex reflector thereon and define a diagonally disposed receptacle open at an upper end for the reception of a cigarette package, said receptacle in conjunction with another receptacle below open at a side under a diagonal wall of the upper receptacle for the reception of ashes, an attaching means pivotally supporting the combine for attachment to the dash or instrument board of an automobile.

3. In a combined smoker's kit and reflective viewing means, unitary construction whereby a bottom wall, an upstanding substantially rectangular rear wall, a narrower substantially rectangular side wall defined in interior dimension by the thickness of a cigarette package, an outwardly protruding corner defining in part a diagonally disposed receptacle and forming in part the said side wall, a portional front wall of substantially the outline of the rear wall and having an outwardly protruding inclined framing opening within its bounds and a mirror set at an incline therein, define an upper corner supporting structure having an attached convex reflector thereon and define a diagonally disposed receptacle open at an upper end for the reception of a cigarette package, said receptacle in conjunction with another receptacle below open at a side under a diagonal wall of the upper receptacle for the reception of ashes, a roughened surface on said diagonal wall above said opening, a removable drawer for said lower receptacle frictionally engaging a corner defined by diagonal division walls of said receptacles, the diagonally disposed receptacle having a skeleton front within the bounds of the said framing opening and said convex reflector support structure having a vertical slot whereby the said front mirror may be set from the interior and let through the said slot and said skeleton opening before said convex reflector is attached and a cigarette package is disposed in said receptacle, an attaching means pivotally supporting the combine to change the angle of reflection of the said front mirror.

4. In a combined smoker's kit and reflective viewing means, a bottom wall, an upstanding substantially rectangular rear wall, a narrower substantially rectangular side wall defined in interior dimension by the thickness of a cigarette package, a portional front wall substantially the outline of the rear wall and having an outwardly protruding framing opening within its bounds and a mirror therein, an inclined cigarette package receptacle and a conjuncting ash receptacle of a smoker's kit defined within said walls, said receptacles compactly disposed behind said mirror and the said mirror viewing means defined within the bounds defined at the front by the said compact conjuncting receptacles, an attaching means pivotally supporting the combine to change the angle of reflection of the said mirror from its normal angle.

5. In a combined smoker's kit and reflective viewing means, unitary construction whereby a diagonally disposed receptacle for the reception of a cigarette package defining oppositely disposed diagonal lower walls forms a top side of an ash receptacle, the two receptacles defining a side, a rear and a bottom wall, and a portional front wall, continuation of the said side, rear and front walls above a part of the said diagonal receptacle to define an upper corner support structure, an attachable convex reflector thereon, all of the exterior walls of said receptacles defining an upstanding substantially rectangular body in connection with a rectangular vertically inclined mirror framed into said portional front wall forming in part said front wall, a roughened surface on an exterior inclined wall of said inclined receptacle, a removable ash drawer disposed in said ash receptacle, and an attaching means pivotally supporting the body.

PAUL W. LEFFLAND.